US008385261B2

(12) United States Patent
Lee et al.

(10) Patent No.: US 8,385,261 B2
(45) Date of Patent: Feb. 26, 2013

(54) METHODS AND SYSTEMS FOR SETTING CID MASK LENGTH OF A HARQ-MAP/SUB-MAP POINTER IE IN WIMAX SYSTEMS

(75) Inventors: Kuo-Chun Lee, San Diego, CA (US); Patrick Lim, San Diego, CA (US); Tom Chin, San Diego, CA (US); Wei Zhang, San Diego, CA (US); Yu Wang, San Diego, CA (US); Chun Woo Lee, San Ramon, CA (US); Fangqi Hu, San Diego, CA (US); Guangming Shi, San Diego, CA (US); Feng Guo, San Diego, CA (US); Ta Yan Siu, San Diego, CA (US); Doo Seok Kim, San Diego, CA (US); Jong Ro Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 888 days.

(21) Appl. No.: 12/358,043

(22) Filed: Jan. 22, 2009

(65) Prior Publication Data

US 2010/0185910 A1    Jul. 22, 2010

(51) Int. Cl.
*H04W 28/00*    (2009.01)
(52) U.S. Cl. .................. 370/328; 370/395.3; 714/748
(58) Field of Classification Search .................. 370/328, 370/338, 395.3, 445; 714/748
See application file for complete search history.

(56) References Cited

U.S. PATENT DOCUMENTS

| | | | |
|---|---|---|---|
| 2007/0162610 A1* | 7/2007 | Un et al. ................ | 709/230 |
| 2007/0177627 A1* | 8/2007 | Raju et al. ............. | 370/469 |
| 2008/0153504 A1* | 6/2008 | Bourlas et al. ......... | 455/452.1 |
| 2009/0017834 A1* | 1/2009 | Lim et al. .............. | 455/450 |
| 2009/0092076 A1* | 4/2009 | Zheng et al. ........... | 370/328 |
| 2010/0103930 A1* | 4/2010 | Lin et al. ............... | 370/389 |

FOREIGN PATENT DOCUMENTS

EP    1679932 A1    7/2006

OTHER PUBLICATIONS

International Search Report & Written Opinion—PCT/US2010/021851—International Search Authroity—European Patent Office—May 20, 2010.
"Remedy for Relaying Compressed DL-MAP/UL-MAP, HARQ-MAP and SUB-DL-UL-MAP" IEEE 802.16 Broadband Wireless Access Working Group vol. IEEE C802.16j-07/373, Jul. 5, 2007, pp. 1-6, XP002579573, Retrieved from the Internet: URL: http://www.ieee802.org/16/relay/contrib/C80216j-07_373.pdf [retrieved on Apr. 19, 2010].

* cited by examiner

*Primary Examiner* — Brian D Nguyen
(74) *Attorney, Agent, or Firm* — Tyler J. Overall

(57) ABSTRACT

Methods and apparatus for setting the connection identifier (CID) mask length of a Hybrid Automatic Repeat-Request (HARQ)-MAP or a SUB-MAP pointer information element (IE) in a compressed downlink map (DL-MAP) of an orthogonal frequency-division multiple access (OFDMA) frame are provided in an effort to reduce the number of false indications in the CID mask, while also striving, as a secondary concern, to reduce the CID mask length. In this manner, an individual mobile station (MS) may not waste processing, battery power, or time interpreting a HARQ-MAP message or a sub downlink/uplink map (SUB-DL-UL-MAP) message that was not intended for this particular MS. For some embodiments where the CID mask length is set to be small, the control overhead (i.e., the size of the HARQ-MAP or the SUB-MAP pointer IE) may be decreased, and more of the OFDMA frame may be available for data traffic.

36 Claims, 9 Drawing Sheets

HARQ-MAP and Sub-MAP pointer IE format    ←—600

| Syntax | Size | Notes |
|---|---|---|
| HARQ and Sub-MAP_Pointer_IE() { | — | — |
|   Extended DIUC | 4 bits | HARQ_P = 0x07 |
|   Length | 4 bits | |
|   While (data remains) { | — | — |
|     DIUC | 4 bits | Indicates the AMC level of the burst containing an HARQ MAP message |
|     No. Slots | 8 bits | The number of slots allocated for the burst containing an HARQ MAP message |
| | 4 bits | |
|     Repetition Coding Indication | 2 bits | 0b00 - No repetition coding<br>0b01- Repetition coding of 2 used<br>0b10 - Repetition coding of 4 used<br>0b11 - Repetition coding of 6 used |
|     MAP Version | 2 bits | 0b00 - HARQ MAPv1<br>0b01- Sub-MAP<br>0b10 - Sub-MAP with CID Mask included<br>0b11 - *Reserved* |
|     If (MAP Version == 0b10) { | — | — |
|       Idle users | 1 bit | Bursts for Idle users included in the Sub MAP |
|       Sleep users | 1 bit | Bursts for Sleep users included in the Sub MAP |
|       CID Mask Length | 2 bits | 0b00: 12 bits<br>0b01: 20 bits<br>0b10: 36 bits<br>0b11: 52 bits |
|       CID mask | $n$ bits | $n$ = The number of bits of CID mask is determined by CID Mask Length. When the MAP message pointed by this pointer IE includes any MAP IE for an awake mode MS, the bit index corresponding to ((Basic CID of the MS) MOD $n$) in this CID mask field shall be set to 1. Otherwise, it may be set to 0. |
|     } | — | — |
|     *Reserved* | 0 or 4 bits | For a byte alignment of IE. Shall be set to zero |
| } | — | — |

610 { CID Mask Length row }
620 { CID mask row }

FIG. 6 n=52:  Allocated Basic CIDs (810)

|  | CID mod n | 15 mod 52 = 15 | 36 mod 52 = 36 | 96 mod 52 = 44 |
|---|---|---|---|---|
| Non-Allocated Basic CIDs (820) | 17 mod 52 = 17 | ≠ | ≠ | ≠ |
|  | 23 mod 52 = 23 | ≠ | ≠ | ≠ |
|  | 49 mod 52 = 49 | ≠ | ≠ | ≠ |
|  | 76 mod 52 = 24 | ≠ | ≠ | ≠ |

FIG. 8A n=36:  Allocated Basic CIDs (810)

|  | CID mod n | 15 mod 36 = 15 | 36 mod 36 = 0 | 96 mod 36 = 24 |
|---|---|---|---|---|
| Non-Allocated Basic CIDs (820) | 17 mod 36 = 17 | ≠ | ≠ | ≠ |
|  | 23 mod 36 = 23 | ≠ | ≠ | ≠ |
|  | 49 mod 36 = 13 | ≠ | ≠ | ≠ |
|  | 76 mod 36 = 4 | ≠ | ≠ | ≠ |

FIG. 8B n=20:  Allocated Basic CIDs (810)

|  | CID mod n | 15 mod 20 = 15 | 36 mod 20 = 16 | 96 mod 20 = 16 |
|---|---|---|---|---|
| Non-Allocated Basic CIDs (820) | 17 mod 20 = 17 | ≠ | ≠ | ≠ |
|  | 23 mod 20 = 3 | ≠ | ≠ | ≠ |
|  | 49 mod 20 = 9 | ≠ | ≠ | ≠ |
|  | 76 mod 20 = 16 | ≠ | Collision ~830 | Collision ~830 |

FIG. 8C n=12:  Allocated Basic CIDs (810)

|  | CID mod n | 15 mod 12 = 3 | 36 mod 12 = 0 | 96 mod 12 = 0 |
|---|---|---|---|---|
| Non-Allocated Basic CIDs (820) | 17 mod 12 = 5 | ≠ | ≠ | ≠ |
|  | 23 mod 12 = 11 | ≠ | ≠ | ≠ |
|  | 49 mod 12 = 1 | ≠ | ≠ | ≠ |
|  | 76 mod 12 = 4 | ≠ | ≠ | ≠ |

FIG. 8D

METHODS AND SYSTEMS FOR SETTING CID MASK LENGTH OF A HARQ-MAP/SUB-MAP POINTER IE IN WIMAX SYSTEMS

TECHNICAL FIELD

Certain embodiments of the present disclosure generally relate to wireless communications and, more particularly, to setting the connection identifier (CID) mask length and generating the CID mask of a Hybrid Automatic Repeat-Request (HARQ)-MAP or a SUB-MAP pointer information element (IE) in mobile WiMAX systems.

BACKGROUND

Orthogonal frequency-division multiplexing (OFDM) and orthogonal frequency division multiple access (OFDMA) wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations.

Under the current versions of the IEEE 802.16x standards for the OFDM and OFDMA systems, every downlink subframe from a base station includes a preamble, a frame control header (FCH) following the preamble, and a downlink map (DL-MAP) following the FCH as part of the overhead load. The preamble includes information for searching a cell and a cell sector within a cell and for synchronizing a mobile station in both time and frequency with the received downlink signal. The FCH portion of the downlink subframe includes 24 bits with information on the downlink transmission format (e.g., the DL-MAP) and control information for the downlink data reception (e.g., allocation of the subcarriers in the current downlink frame). The DL-MAP specifies downlink data region allocation and burst profile information so that the DL data bursts in the OFDM/OFDMA frame may be correctly decoded. The first DL data burst is typically an uplink map (UL-MAP) containing similar allocation and burst profile information for uplink transmissions on a per-frame basis, which may also be considered as part of the control overhead.

The control overhead consumes both time and frequency resources in an OFDM or OFDMA frame, and the control messages grow with the number of concurrent users (e.g., mobile stations) supported by a base station. Because these time and frequency resources are limited on a per-frame basis, greater consumption of these resources by the control overhead means there are fewer resources for data traffic. Moreover, because most control messages are encoded with the lowest coding rate so that these messages may be reliably received by as many mobile stations as possible, a small increase in the size of the control messages leads to a considerably larger increase in the consumption of the frame resources. As a result of increasing control overhead, maximum data throughput of a mobile station will decrease exponentially as the number of concurrent users increases.

SUMMARY

Certain embodiments of the present disclosure generally relate to setting the connection identifier (CID) mask length of a Hybrid Automatic Repeat-Request (HARQ)-MAP or a SUB-MAP pointer information element (IE) in a compressed downlink map (DL-MAP) of an OFDMA frame in an effort to decrease the number of false indications in the CID mask and to shorten the CID mask length.

Certain embodiments of the present disclosure provide a method for setting a CID mask length of a pointer IE in a wireless communication network. The method generally includes determining, for each of a plurality of possible CID mask lengths, a number of colliding mobile stations (MSs), wherein a colliding MS has a non-allocated basic CID having a collision with one or more allocated basic CIDs of the pointer IE, the collision occurring when the non-allocated CID modulo one of the possible CID mask lengths equals one of the allocated basic CIDs modulo the same one of the possible CID mask lengths; selecting, from among the plurality of possible CID mask lengths, the CID mask length with the least number of colliding MSs; and transmitting the selected CID mask length in the pointer IE.

Certain embodiments of the present disclosure provide a computer-program product for setting a CID mask length of a pointer IE in a wireless communication network. The computer-program product typically includes a computer-readable medium having instructions stored thereon, the instructions being executable by one or more processors. The instructions generally include instructions for determining, for each of a plurality of possible CID mask lengths, a number of colliding MSs, wherein a colliding MS has a non-allocated basic CID having a collision with one or more allocated basic CIDs of the pointer IE, the collision occurring when the non-allocated CID modulo one of the possible CID mask lengths equals one of the allocated basic CIDs modulo the same one of the possible CID mask lengths; instructions for selecting, from among the plurality of possible CID mask lengths, the CID mask length with the least number of colliding MSs; and instructions for transmitting the selected CID mask length in the pointer IE.

Certain embodiments of the present disclosure provide an apparatus for setting a CID mask length of a pointer IE in a wireless communication network. The apparatus generally includes means for determining, for each of a plurality of possible CID mask lengths, a number of colliding MSs, wherein a colliding MS has a non-allocated basic CID having a collision with one or more allocated basic CIDs of the pointer IE, the collision occurring when the non-allocated CID modulo one of the possible CID mask lengths equals one of the allocated basic CIDs modulo the same one of the possible CID mask lengths; means for selecting, from among the plurality of possible CID mask lengths, the CID mask length with the least number of colliding MSs; and means for transmitting the selected CID mask length in the pointer IE.

Certain embodiments of the present disclosure provide a base station (BS). The BS generally includes logic for determining, for each of a plurality of possible CID mask lengths, a number of colliding MSs, wherein a colliding MS has a non-allocated basic CID having a collision with one or more allocated basic CIDs of a pointer IE, the collision occurring when the non-allocated CID modulo one of the possible CID mask lengths equals one of the allocated basic CIDs modulo the same one of the possible CID mask lengths; logic for selecting, from among the plurality of possible CID mask lengths, a CID mask length with the least number of colliding MSs; and a transmitter front end configured to transmit the selected CID mask length in the pointer IE.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 6 illustrates an example format of a HARQ MAP or SUB-MAP pointer IE having fields for the connection identifier (CID) mask length and the CID mask, in accordance with certain embodiments of the present disclosure.

FIGS. 8A-D provide an example illustrating the operations of FIG. 7 for setting the CID mask length, in accordance with certain embodiments of the present disclosure.

DETAILED DESCRIPTION

Figure 1:
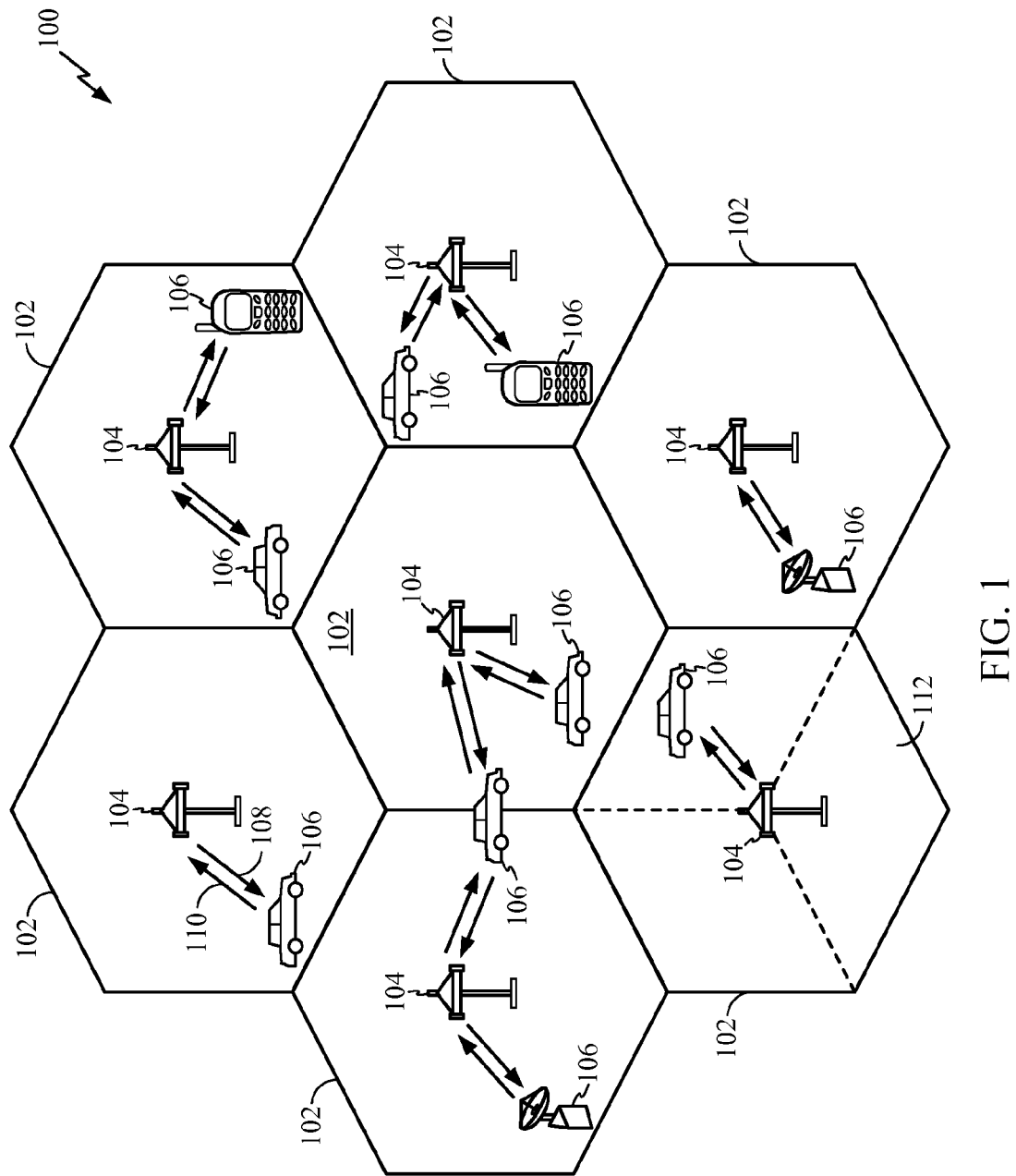
FIG. 1 illustrates an example wireless communication system, in accordance with certain embodiments of the present disclosure.

Certain embodiments of the present disclosure provide methods and apparatus for setting the connection identifier (CID) mask length of a Hybrid Automatic Repeat-Request (HARQ)-MAP or a SUB-MAP pointer information element (IE) in a compressed downlink map (DL-MAP) of an OFDM/OFDMA frame in an effort to reduce the number of false indications in the CID mask, while also striving, as a secondary concern, to reduce the CID mask length. In this manner, an individual mobile station (MS) may not waste processing, battery power, or time interpreting a HARQ-MAP message or a sub downlink/uplink map (SUB-DL-UL-MAP) message that was not intended for this particular MS. For some embodiments where the CID mask length is set to be small, the control overhead (i.e., the size of the HARQ-MAP or the SUB-MAP pointer IE) may be decreased, and more of the OFDM/OFDMA frame may be available for data traffic.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
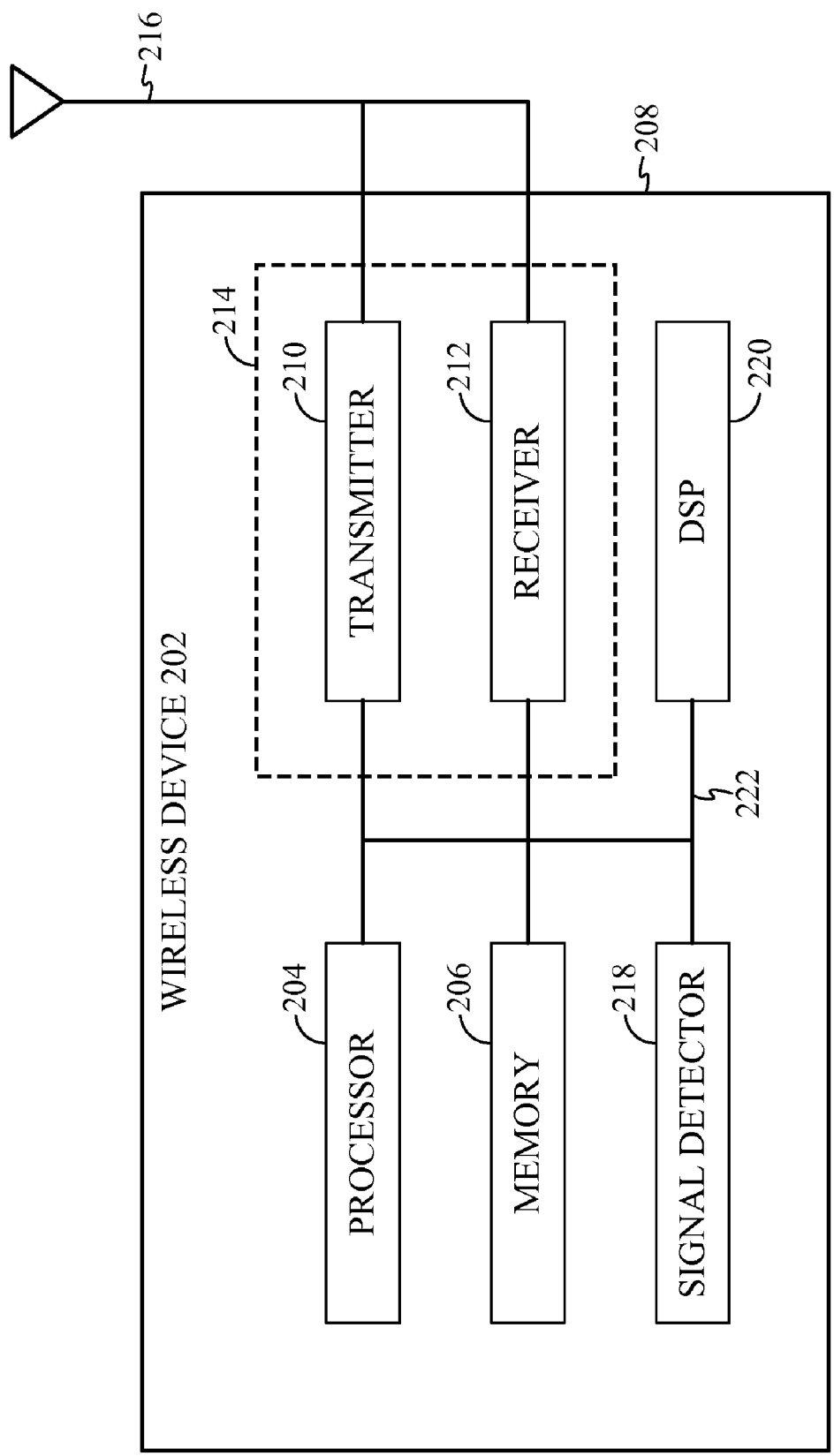
FIG. 2 illustrates various components that may be utilized in a wireless device, in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
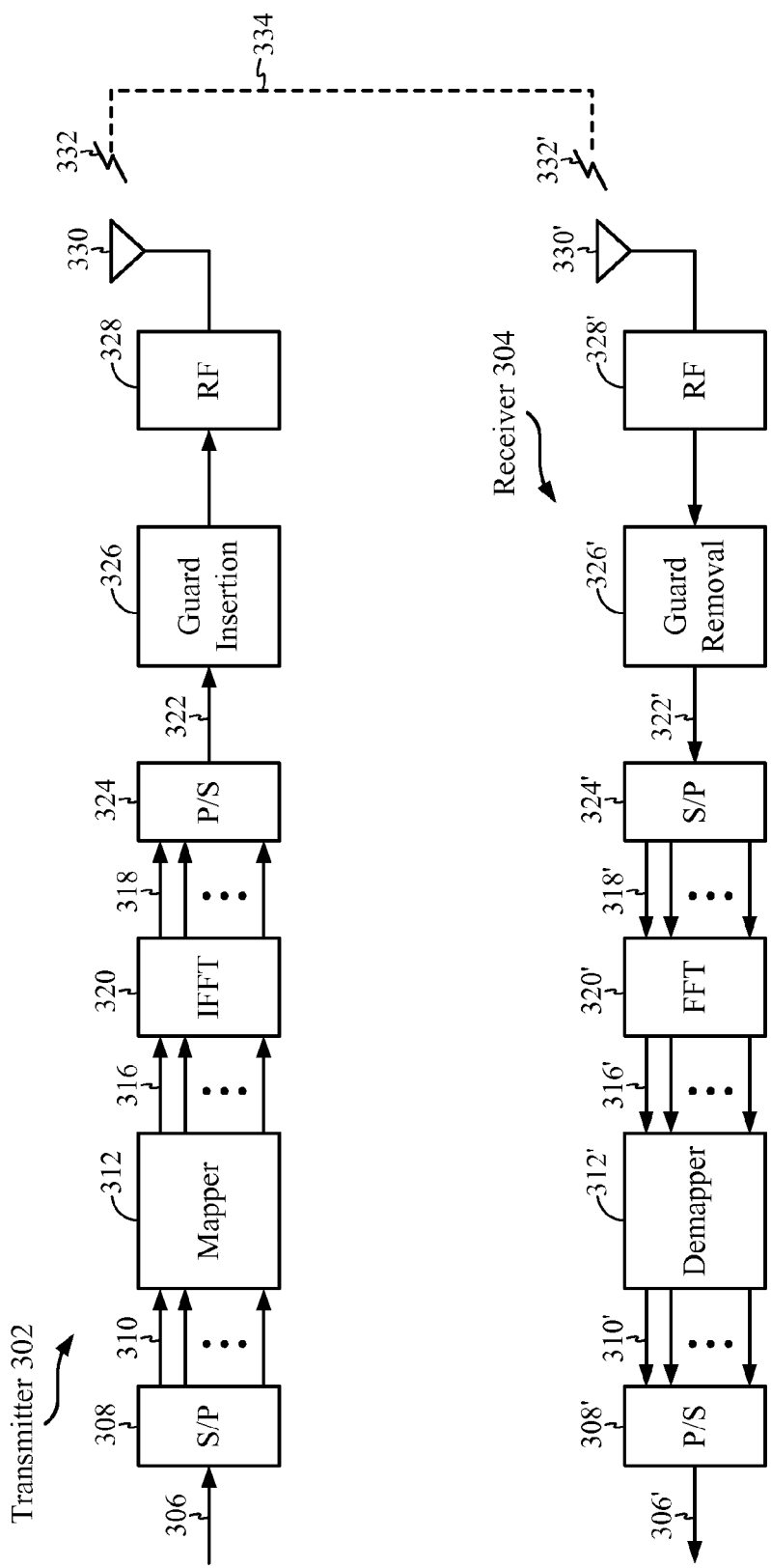
FIG. 3 illustrates an example transmitter and an example receiver that may be used within a wireless communication system that utilizes orthogonal frequency-division multiplexing and orthogonal frequency division multiple access (OFDM/OFDMA) technology, in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 3 10.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary DL Subframe of an OFDM/OFDMA Frame

Figure 4:
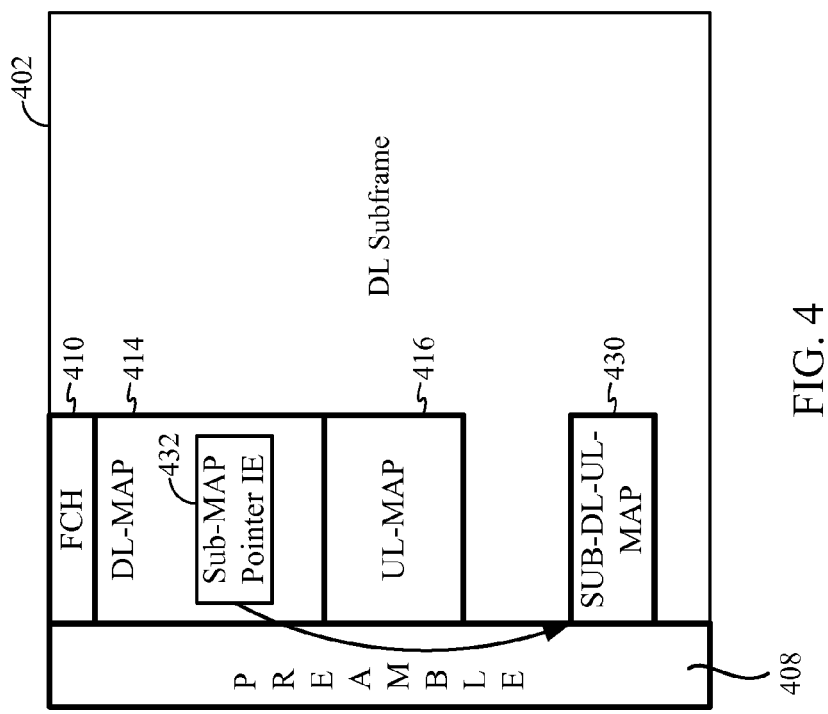
FIG. 4 illustrates an example downlink (DL) subframe of an OFDM/OFDMA frame for Time Division Duplex (TDD), wherein the DL-MAP includes a SUB-MAP pointer information element (IE) for locating a sub downlink/uplink map (SUB-DL-UL-MAP) message, in accordance with certain embodiments of the present disclosure.

FIG. 4 illustrates an example downlink (DL) subframe 402 of an OFDM/OFDMA frame for Time Division Duplex (TDD). The uplink (UL) subframe, which typically follows the DL subframe 402, is not shown. In the TDD implementation, the DL subframe 402 and the UL subframe may be separated by a small guard interval—or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/OFDMA frame, various control information may be included. For example, the first OFDM/OFDMA symbol of the frame may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 2 is to be used.

A Frame Control Header (FCH) 410 may follow the preamble 408. The FCH 410 may provide frame configuration information, such as the usable subchannels, the modulation and coding scheme (MCS), and the MAP message length for the current OFDM/OFDMA frame. A data structure, such as the downlink Frame Prefix (DLFP), outlining the frame configuration information may be mapped to the FCH 410.

The DLFP for Mobile WiMAX may comprise six bits for the used subchannel (SCH) bitmap, a reserved bit set to 0, two bits for the repetition coding indication, three bits for the coding indication, eight bits for the MAP message length, and four reserved bits set to 0 for a total of 24 bits in the DLFP. Before being mapped to the FCH 410, the 24-bit DLFP may be duplicated to form a 48-bit block, which is the minimal forward error correction (FEC) block size.

Following the FCH 410, a DL-MAP 414 and a UL-MAP 416 may specify subchannel allocation and other control information for the DL subframe 402 and the UL subframe, respectively. In the case of OFDMA, multiple users may be allocated data regions within the frame, and these allocations may be specified in the DL and UL-MAP 414, 416. The MAP messages may include the burst profile for each user, which defines the modulation and coding scheme (MCS) used in a particular link. Since MAP messages contain critical information that needs to reach all users, the DL and UL-MAP 414, 416 may often be sent over a very reliable link, such as BPSK or QPSK with rate 1/2 coding and repetition coding. The DL subframe 402 of the OFDM/OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe may include UL bursts of various bit lengths composed of the uplink data being communicated. Therefore, the UL-MAP 416, transmitted as the first burst in the downlink subframe 402, may contain information about the location of the UL burst for different users. The UL subframe may include additional control information. The UL subframe may include a UL ACK allocated for the mobile station (MS) to feed back a DL hybrid automatic repeat request acknowledge (HARQ ACK) and/or a UL CQICH allocated for the MS to feed back channel state information on the Channel Quality Indicator channel (CQICH). Furthermore, the UL subframe may comprise a UL Ranging subchannel. The UL Ranging subchannel may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

In order to reduce the data bandwidth overhead in sending DL-MAP or UL-MAP messages, the allocation of data bursts can be alternatively achieved by utilizing different types of messages that can be transmitted using more efficient modulation coding schemes (MCSs). As an example, WiMAX standard supports data burst allocation using sub downlink/uplink map (SUB-DL-UL-MAP) messages 430 that follow a compressed DL-MAP 414 and a compressed UL-MAP 416 in the DL subframe 402. Each SUB-DL-UL-MAP message 430 may allocate both DL and UL data bursts. By using these alternative messages, data burst allocation information may be transmitted more efficiently, which may effectively reduce the signaling bandwidth overhead in mobile WiMAX systems.

Current versions of the WiMAX standard support up to three SUB-DL-UL-MAP messages 430 per DL subframe 402. These SUB-DL-UL-MAP messages 430 may be utilized for data burst allocation instead of using DL-MAP or UL-MAP messages. For certain embodiments, MSs may be partitioned into different groups, with each group assigned to a different SUB-DL-UL-MAP message 430 based on the reported CINR of the MSs. Since up to three SUB-DL-UL-MAP messages 430 can be specified per frame, up to three groups of data burst allocations may be defined. The SUB-DL-UL-MAP messages 430 may be contained in different bursts and may be transmitted using different MCSs. The data burst for each SUB-DL-UL-MAP message 430 is allocated by the compressed DL-MAP 414 using the appropriate SUB-MAP pointer information element (IE) 432, described in greater detail below.

To improve the reliability of data transmission, some wireless systems employ a Hybrid Automatic Repeat-Request (HARQ) scheme where error detection (ED) bits and forward error correction (FEC) bits are added to transmissions. A receiver can use these ED and FEC bits to determine whether or not a packet was decoded properly. If not, the receiver may signal the transmitter via a negative acknowledgment (NAK), prompting the transmitter to retransmit the packet.

Figure 5:
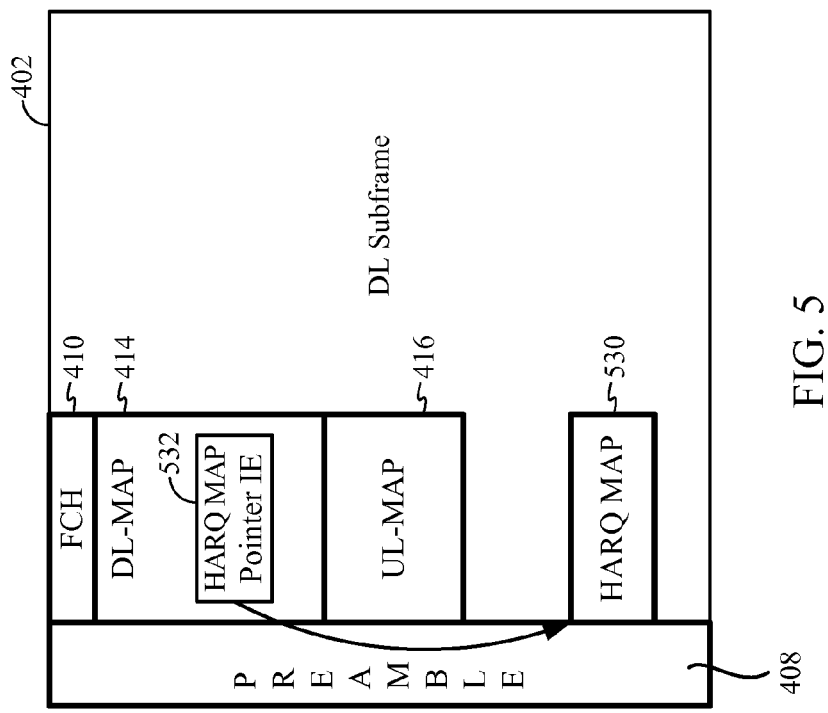
FIG. 5 illustrates an example DL subframe of an OFDM/OFDMA frame for TDD, wherein the DL-MAP includes a Hybrid Automatic Repeat-Request (HARQ) MAP pointer IE for locating a HARQ MAP message, in accordance with certain embodiments of the present disclosure.

Referring now to FIG. 5, HARQ-MAP messages 530 may be another type of message for achieving data burst allocation in an effort to reduce the data bandwidth overhead in sending DL-MAP or UL-MAP messages. Similar to SUB-DL-UL-MAP messages 430, HARQ-MAP messages 530 may also follow a compressed DL-MAP 414 and a compressed UL-MAP 416 in the DL subframe 402 and may be encoded with different selected MCSs. By allocating burst information with the HARQ-MAP messages 530 rather than allocating all bursts with the conservatively encoded regular DL-MAP or UL-MAP messages, system resources may be conserved. Besides allocating both DL and UL data bursts, each HARQ-MAP message 530 may also specify the HARQ control information (i.e., the subpacket ID and the HARQ channel ID), the CQICH information for fast channel feedback allocation, and the ACK control information for the HARQ ACK channel. HARQ-MAP messages may be used as an alternative to, or in addition to, using SUB-DL-UL-MAP messages for allocating data bursts.

WiMAX standards (in the IEEE 802.16 family) may support up to four HARQ-MAP messages 530 per DL subframe 402. Each HARQ-MAP message 530 may be used to allocate the bandwidth for MSs that are characterized with similar CINR values, and the grouping of MSs with a particular HARQ-MAP message 530 may be accomplished in a similar manner as described above with reference to using SUB-DL-UL-MAP messages 430 for data burst allocation. The data burst for each HARQ-MAP message 530 may be allocated by the compressed DL-MAP 414 using the appropriate HARQ-MAP pointer IE 532, described in greater detail below.

Exemplary HARQ-MAP or SUB-MAP Pointer IE

FIG. 6 illustrates an example format 600 of a HARQ MAP or SUB-MAP pointer IE 432, 532 with the syntax and size in bits of the various fields in the format 600 according to the IEEE 802.16e standard. The pointer IE 432, 532 may include fields for the CID mask length 610 and the CID mask 620, where the basic CID specifies the MS to which the message in the HARQ-MAP 530 or the SUB-DL-UL-MAP 430 pertains (i.e., the MS not in either sleep mode or idle mode for which the data burst is allocated). Two bits may be used to specify the CID mask length 610, and the WiMAX standard defines the two-bit length possibilities as 12 bits represented by 0b00, 20 bits represented by 0b01, 36 bits represented by 0b10, and 52 bits represented by 0b11 (n=12, 20, 36, or 52 bits, where n is the CID mask length 610).

The CID mask 620 has a length of n bits specified by the CID mask length 610. The kth bit of the CID mask 620 is set to 1 if there is a data burst allocation in the SUB-DL-UL-MAP or HARQ-MAP message 430, 530 pointed to by this particular pointer IE 432, 532 for a basic CID of the MS modulo k. In other words, if u represents the basic CID of an MS which has an allocated data burst, then the CID mask 620 will have a bit set to 1 at the kth bit for at least one u mod n=k. Otherwise, no data burst allocation is indicated for other active MSs having different basic CIDs, and the remaining bits of the CID mask 620 are set to 0.

Although four CID mask lengths are possible (n=12, 20, 36, or 52 bits) according to IEEE 802.16e, the standard does not specify how the CID mask length 610 is to be chosen. Furthermore, because of the modulo operation, an MS that does not have an allocated data burst in a particular SUB-DL-UL-MAP or HARQ-MAP message 430, 530 may have a basic CID that yields the same remainder (i.e., the result of the modulo operation) as another MS with a different basic CID that has an allocated data burst in the message 430, 530 for a given CID mask length 610. Thus, the CID mask 620 in the pointer IE 432, 532 would have the kth bit set to 1 for u mod n=k, where u is the basic CID of the MS with the allocated data burst. The MS without the allocated data burst may receive the pointer IE 432, 532 within the compressed DL-MAP 414 of an OFDMA frame and interpret the CID mask 620 to mean that there is a data burst in the corresponding message 430, 530 pointed to by the pointer IE.

Therefore, in the interests of compressing the DL-MAP 414, the CID mask 620 falsely indicated to the MS without an allocated data burst that the SUB-DL-UL-MAP or HARQ-MAP message 430, 530 contained relevant data for this MS. Thus, this MS wasted processing time and battery power to decode a message 430, 530 that was not directed to this MS. Accordingly, some benefit may be gained by intelligently selecting from among the four possible CID mask lengths in an effort to reduce the number of false indications.

Exemplary Technique for Setting the CID Mask Length

Figure 7:
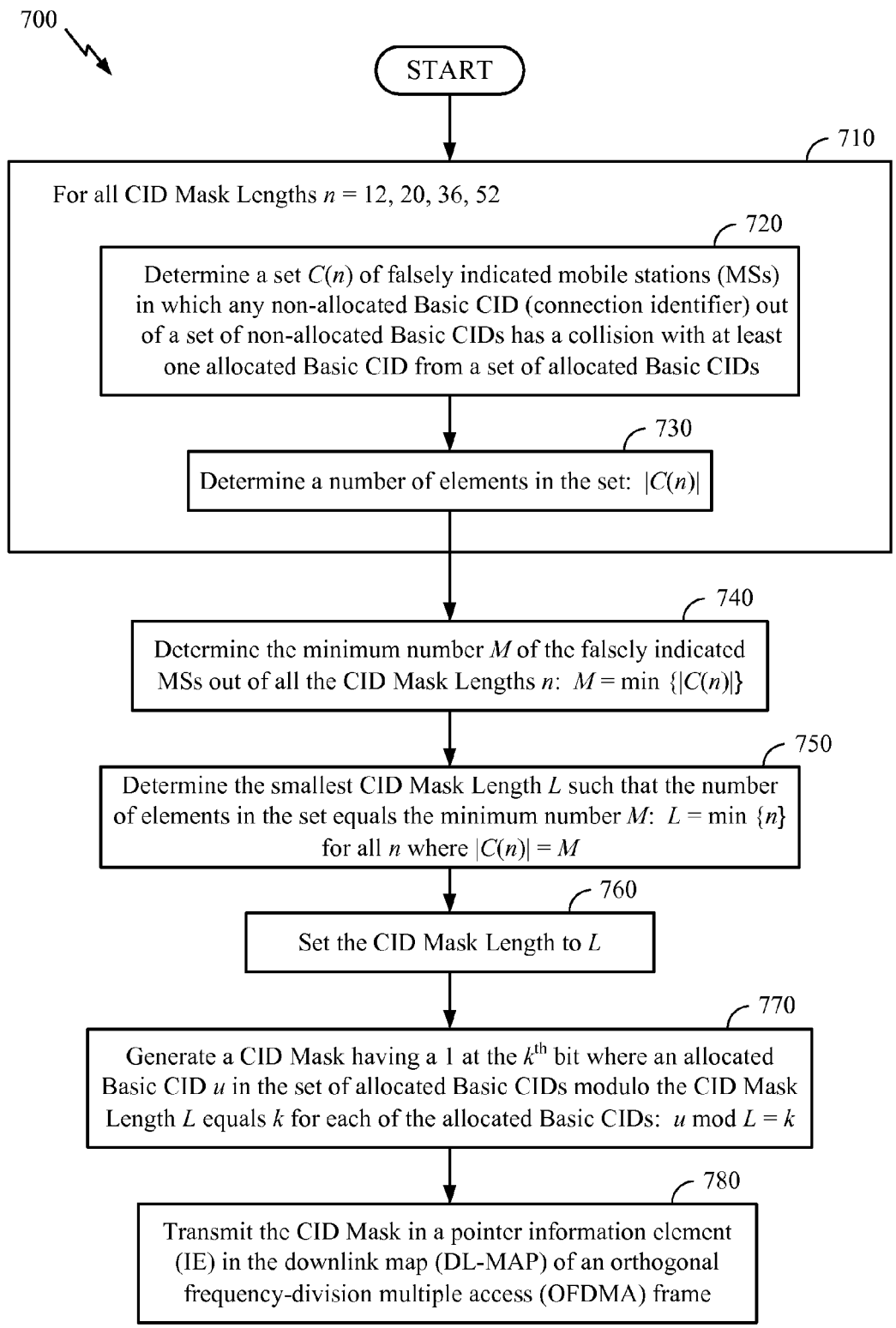
FIG. 7 is a flow diagram of example operations for setting the CID mask length, in accordance with certain embodiments of the present disclosure.

FIG. 7 is a flow diagram of example operations 700 for setting the CID mask length 610 and generating the CID mask 620, in accordance with certain embodiments of the present disclosure. The operations 700 pertain to setting the CID mask length 610 of a single pointer IE 432, 532, but may be repeated for each pointer IE in the DL subframe 402. The operations 700 may be performed by the network or by a particular BS 104, for example.

By determining the CID mask length 610 according to these operations 700, a BS 104 may reduce the number of non-allocated MSs being falsely indicated by a pointer IE 432, 532 to have a data burst allocation in a SUB-DL-UL-MAP or HARQ-MAP message 430, 530. In this manner, an MS without an allocated data burst may save valuable processing time by not having to decode or parse a non-interesting message 430, 530 that was not directed to this MS, while an allocated MS may still decode or parse a SUB-DL-UL-MAP or HARQ-MAP message 430, 530 intended without a tradeoff or sacrifice. The operations 700 may also lead to the smallest possible CID mask length 610 out of all CID mask lengths with the same number of false indications, thereby reducing the control overhead in the OFDMA frame.

The operations 700 may begin, at 710, by performing a series of operations 720, 730 for all of the possible CID mask lengths 610 (n=12, 20, 36, or 52). At 720, the BS 104 may determine a set C(n) of falsely indicated MSs for a particular n. To accomplish this, the BS 104 may determine a set A={u1, u2, ..., up} of all the basic CIDs with an allocated data burst in the message 430, 530 pointed to by this particular pointer IE 432, 532, where u is the basic CID and p is the number of MSs having an allocated data burst in the message. The BS 104 may also determine a set B={v1, v2, ..., vq} of all the basic CIDs without an allocated data burst in the message 430, 530, where v is the basic CID and q is the number of MSs communicating with the BS 104 that do not have an allocated data burst in the message.

For an n-bit CID mask, two basic CIDs, one from set A and one from set B, have a collision when u mod n=v mod n. Therefore, the set C(n) of colliding or falsely indicated MSs for a particular n may be identified as the set of all basic CIDs without an allocated data burst (i.e., from set B) having a collision with at least one basic CID with an allocated data burst (i.e., from set A). In other words:

$$C(n)=\{v \text{ in } B | v \bmod n = u \bmod n \text{ for at least one } u \text{ in } A\}.$$

Once set C(n) has been determined, the cardinality (i.e., the number of elements of a set) of the set C(n) may be determined at 730. The cardinality of set C(n) may be expressed mathematically as |C(n)|. The operations 720 and 730 may be repeated for all possible CID mask lengths n.

Once operations 720 and 730 have been performed for all possible CID mask lengths n, the BS 104 may determine the minimum number M of the falsely indicated MSs out of all the CID mask lengths n at 740. This may be expressed mathematically as M=min {|C(n)|}. At 750, the BS 104 may determine the smallest CID mask length L such that the number of elements in set C(n) equals the minimum number M determined at 740. This may be expressed mathematically as L=min {n} for all values n where |C(n)|=M. At 760, the CID mask length 610 may be set to L in the CID Mask Length field of the pointer IE 432, 532. In this manner, the smallest length CID mask is selected while achieving the minimum number of falsely indicated MSs.

At 770, the BS 104 may generate a CID mask 620. The CID mask 620 may be generated by setting the kth bit to 1 wherever an element in set A (i.e., a basic CID u having an allocated data burst) modulo the CID mask length L equals k. In other words, the kth bit of the CID mask 620 may be set to 1 wherever u mod L=k for each of the allocated basic CIDs u.

At 780, the BS 104 may transmit the generated CID mask 620 in a pointer IE 432, 532 in the compressed DL-MAP 414 of an OFDMA frame. The SUB-MAP pointer IE 432 or the HARQ-MAP pointer IE 532 may point to a SUB-DL-UL-MAP 430 or a HARQ MAP 530, respectively. The same OFDMA frame may contain several pointer ILEs 432, 532 having CID masks 620 generated according to the operations 700.

Exemplary Technique for Setting the CID Mask Length

To understand the operations 700 for setting the CID mask length 610, an example may be helpful. Assume that the MSs having an allocated data burst in a SUB-DL-UL-MAP 430 or a HARQ MAP 530 possess basic CIDs of 15, 36, and 96 and that the MSs without an allocated data burst in the message possess basic CIDs of 17, 23, 49, and 76. Thus, set A={15, 36, 96} and set B={17, 23, 49, 76}.

FIG. 8A illustrates determining a set C(52) of falsely indicated MSs where a collision occurs between allocated basic CIDs 810 and non-allocated basic CIDs 820 at 720 in FIG. 7. For example, the basic CID of 17 for the non-allocated basic CIDs 820 may be checked against the allocated basic CIDs 810 to see if v mod n or 17 mod 52=17 is equal to u mod 52, where u is 15, 36, or 96. Since 15 mod 52=15, 36 mod 52=36, and 96 mod 52=44 do not equal 17, no collision occurs for this element of set B with any of the elements in set A for a possible CID mask length of 52. This process may be repeated for the remaining elements such that all of the elements of set A are checked for collisions against all of the elements of set B, or vice versa. Since none of the elements of set B have a collision with any of the elements of set A, set C(52)={ } and is an empty set.

FIGS. 8B-D illustrate repeating this process for possible CID mask lengths of n=36, 20, and 12, respectively. In FIG. 8C, 76 mod 20=16=36 mod 20, and thus, a collision 830 occurs between non-allocated basic CID 76 and allocated basic CID 36. Again, 76 mod 20=16=96 mod 20, and thus, another collision 830 occurs between non-allocated basic CID 76 and allocated basic CID 96. Therefore, set C(20)={76}. With the lack of collisions in FIGS. 8B and 8D, set C(36)=set C(12)={ }.

Accordingly, at 740, the minimum number M of falsely indicated MSs would be 0. In other words, M=min {0, 1, 0, 0}=0. This means that zero falsely indicated MSs may be achieved with some CID masks. At 750, the CID mask length L would be determined to be 12 since L=min {12, 36, 52}=12 for all values n where |C(12)|=|C(36)|=|C(52)|=0. At 760, the CID mask length 610 may be set to 0b00 for a 12-bit CID mask 620.

At 770, the 12-bit CID mask may be generated as 0b000000001001, where the 0th and 3rd bits are set to 1. This is because the allocated basic CIDs in set A modulo L are 15 mod 12=3, 36 mod 12=0, and 96 mod 12=0. Note that only two bits in the CID mask 620 are set, even though there are three allocated basic CIDs.

From this example, a CID mask 620 having the minimum CID mask length 610 of 12 bits was selected. A CID mask length 610 of 20 bits would have falsely indicated to the MS having a basic CID of 76 to read the message 430, 530 pointed to by the pointer IE 432, 532, thereby wasting this MS's processing time to decode or parse a non-interesting message. Although CID mask lengths of 36 or 52 bits would not have falsely indicated any of the non-allocated MSs, a 12-bit CID mask is shorter, thereby reducing control overhead in an OFDMA frame such that more of the frame resources may be used for data communication.

Exemplary Technique for Setting the CID Mask Length

For some embodiments, the operations 720 and 730 illustrated in FIG. 7 need not be repeated for all possible CID mask lengths n. In such embodiments, the operations 720 and 730 may be performed first for the shortest possible CID mask length (n=12). If the number of elements in set C(12) is 0 (indicating that there are no collisions using this particular CID mask length), then the minimum number M of falsely indicated MSs has been found. The CID mask length 610 may be automatically set to n=12, and the operations 720 and 730 need not be repeated for other CID mask lengths (n=20, 36, or 52).

However, if the number of elements in set C(12) is greater than 0, then the operations 720 and 730 may be repeated for the next shortest possible CID mask length (n=20). If the number of elements in set C(20) is 0, then the minimum number M of falsely indicated MSs has been found. The CID mask length 610 may be automatically set to n=20, and the operations 720 and 730 need not be repeated for other larger CID mask lengths (n=36 or 52).

By ordering the possible CID mask lengths n from shortest to longest and performing the operations 720 and 730 on the mask lengths in order, the idea above may be carried out starting with the shortest possible CID mask length (n=12) until the number of elements in a set C(n) is determined to be 0 or until all of the sets C(n) have been determined including that corresponding to the longest possible CID mask length (n=52). In this manner, the procedure for determining the CID mask length 610 may be expedited. If none of the sets C(n) has a cardinality of zero, then the procedure for setting the CID mask length 610 may follow the operations 700 of FIG. 7, beginning at 740.

Overview

Figure 7A:
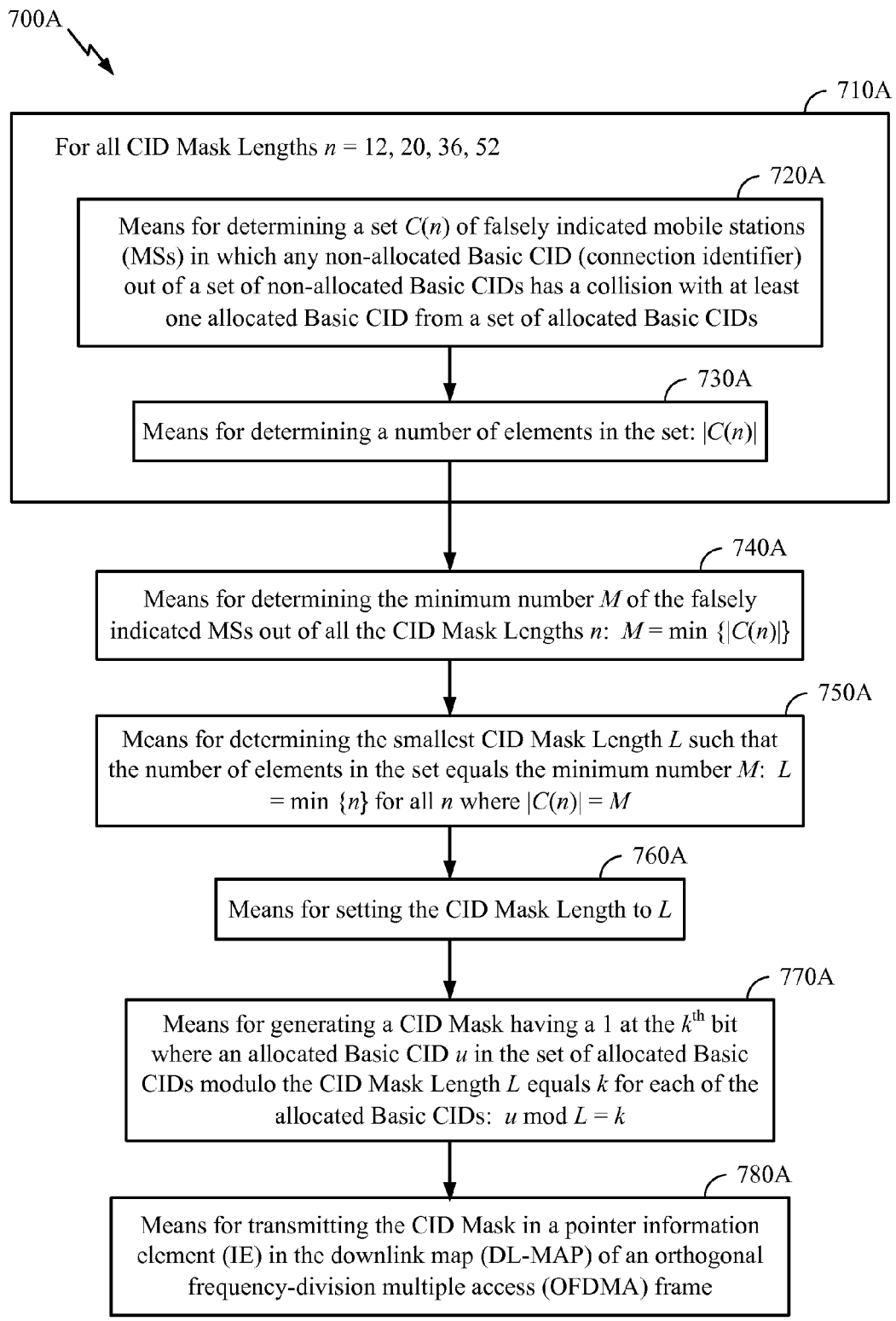
FIG. 7A is a block diagram of means corresponding to the example operations of FIG. 7 for setting the CID mask length, in accordance with certain embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 710-780 illustrated in FIG. 7 correspond to means-plus-function blocks 710A-780A illustrated in FIG. 7A.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Information and signals may be represented using any of a variety of different technologies and techniques. For example, data, instructions, commands, information, signals, and the like that may be referenced throughout the above description may be represented by voltages, currents, electromagnetic waves, magnetic fields or particles, optical fields or particles, or any combination thereof.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by one or more processors, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for setting a connection identifier (CID) mask length of a pointer information element (IE) in a wireless communication network, comprising:
   determining, for each of a plurality of possible CID mask lengths, a number of colliding mobile stations (MSs), wherein a colliding MS for a particular one of the plurality of possible CID mask lengths has a non-allocated basic CID having a collision with one or more allocated basic CIDs of the pointer IE, the collision occurring when the non-allocated CID modulo the particular CID mask length equals one of the one or more allocated basic CIDs modulo the particular CID mask length;
   selecting, from among the plurality of possible CID mask lengths, the CID mask length with the least number of colliding MSs; and
   transmitting the selected CID mask length in the pointer IE.

2. The method of claim 1, wherein the colliding MSs are not in either sleep mode or idle mode.

3. The method of claim 1, wherein the pointer IE is a Hybrid Automatic Repeat-Request (HARQ)-MAP pointer IE for a HARQ MAP message.

4. The method of claim 1, wherein the pointer IE is a sub-MAP IE for a sub-downlink/uplink map (SUB-DL-UL-MAP) message.

5. The method of claim 1, further comprising:
   generating a CID mask having the selected CID mask length; and
   transmitting the CID mask in the pointer IE with the selected CID mask length.

6. The method of claim 5, wherein generating the CID mask comprises setting a kth bit of the CID mask to 1 wherever the one or more allocated basic CIDs modulo the selected CID mask length equals k, for each of the one or more allocated basic CIDs.

7. The method of claim 1, wherein selecting the CID mask length comprises:
   determining a set, from among the plurality of possible CID mask lengths, of two or more possible CID mask lengths having the least number of colliding MSs; and
   selecting, from among the set of two or more possible CID mask lengths, the CID mask length having the shortest length in bits.

8. The method of claim 1, wherein transmitting the CID mask length comprises transmitting the CID mask length in the pointer IE in a downlink map (DL-MAP) of an orthogonal frequency-division multiple access (OFDMA) frame.

9. The method of claim 8, wherein the OFDMA frame is configured in accordance with Institute of Electrical and Electronics Engineers (IEEE) 802.16 technology.

10. A computer-program product for setting a connection identifier (CID) mask length of a pointer information element (IE) in a wireless communication network, the computer-program product comprising a non-transitory computer-readable medium having instructions stored thereon, the instructions being executable by one or more processors and the instructions comprising:
   instructions for determining, for each of a plurality of possible CID mask lengths, a number of colliding mobile stations (MSs), wherein a colliding MS for a particular one of the plurality of possible CID mask lengths has a non-allocated basic CID having a collision with one or more allocated basic CIDs of the pointer IE, the collision occurring when the non-allocated CID modulo the particular CID mask length equals one of the one or more allocated basic CIDs modulo the particular CID mask length;

instructions for selecting, from among the plurality of possible CID mask lengths, the CID mask length with the least number of colliding MSs; and instructions for transmitting the selected CID mask length in the pointer IE.

11. The computer-program product of claim 10, wherein the colliding MSs are not in either sleep mode or idle mode.

12. The computer-program product of claim 10, wherein the pointer IE is a Hybrid Automatic Repeat-Request (HARQ)-MAP pointer IE for a HARQ MAP message.

13. The computer-program product of claim 10, wherein the pointer IE is a sub-MAP IE for a sub-downlink/uplink map (SUB-DL-UL-MAP) message.

14. The computer-program product of claim 10, further comprising:

instructions for generating a CID mask having the selected CID mask length; and instructions for transmitting the CID mask in the pointer IE with the selected CID mask length.

15. The computer-program product of claim 14, wherein the instructions for generating the CID mask comprise instructions for setting a kth bit of the CID mask to 1 wherever the one or more allocated basic CIDs modulo the selected CID mask length equals k, for each of the one or more allocated basic CIDs.

16. The computer-program product of claim 10, wherein the instructions for selecting the CID mask length comprise:

instructions for determining a set, from among the plurality of possible CID mask lengths, of two or more possible CID mask lengths having the least number of colliding MSs; and instructions for selecting, from among the set of two or more possible CID mask lengths, the CID mask length having the shortest length in bits.

17. The computer-program product of claim 10, wherein the instructions for transmitting the CID mask length comprise instructions for transmitting the CID mask length in the pointer IE in a downlink map (DL-MAP) of an orthogonal frequency-division multiple access (OFDMA) frame.

18. The computer-program product of claim 17, wherein the OFDMA frame is configured in accordance with Institute of Electrical and Electronics Engineers (IEEE) 802.16 technology.

19. An apparatus for setting a connection identifier (CID) mask length of a pointer information element (IE) in a wireless communication network, comprising:

means for determining, for each of a plurality of possible CID mask lengths, a number of colliding mobile stations (MSs), wherein a colliding MS for a particular one of the plurality of possible CID mask lengths has a non-allocated basic CID having a collision with one or more allocated basic CIDs of the pointer IE, the collision occurring when the non-allocated CID modulo the particular CID mask length equals one of the one or more allocated basic CIDs modulo the particular CID mask length;

means for selecting, from among the plurality of possible CID mask lengths, the CID mask length with the least number of colliding MSs; and means for transmitting the selected CID mask length in the pointer IE.

20. The apparatus of claim 19, wherein the colliding MSs are not in either sleep mode or idle mode.

21. The apparatus of claim 19, wherein the pointer IE is a Hybrid Automatic Repeat-Request (HARQ)-MAP pointer IE for a HARQ MAP message.

22. The apparatus of claim 19, wherein the pointer IE is a sub-MAP IE for a sub-downlink/uplink map (SUB-DL-UL-MAP) message.

23. The apparatus of claim 19, further comprising:

means for generating a CID mask having the selected CID mask length; and means for transmitting the CID mask in the pointer IE with the selected CID mask length.

24. The apparatus of claim 23, wherein the means for generating the CID mask is configured to set a kth bit of the CID mask to 1 wherever the one or more allocated basic CIDs modulo the selected CID mask length equals k, for each of the one or more allocated basic CIDs.

25. The apparatus of claim 19, wherein the means for selecting the CID mask length comprises:

means for determining a set, from among the plurality of possible CID mask lengths, of two or more possible CID mask lengths having the least number of colliding MSs; and means for selecting, from among the set of two or more possible CID mask lengths, the CID mask length having the shortest length in bits.

26. The apparatus of claim 19, wherein the means for transmitting the CID mask length is configured to transmit the CID mask length in the pointer IE in a downlink map (DL-MAP) of an orthogonal frequency-division multiple access (OFDMA) frame.

27. The apparatus of claim 26, wherein the OFDMA frame is configured in accordance with Institute of Electrical and Electronics Engineers (IEEE) 802.16 technology.

28. A base station (BS), comprising:

logic for determining, for each of a plurality of possible connection identifier (CID) mask lengths, a number of colliding mobile stations (MSs), wherein a colliding MS for a particular one of the plurality of possible CID mask lengths has a non-allocated basic CID having a collision with one or more allocated basic CIDs of a pointer information element (IE), the collision occurring when the non-allocated CID modulo the particular CID mask length equals one of the one or more allocated basic CIDs modulo the particular CID mask length;

logic for selecting, from among the plurality of possible CID mask lengths, a CID mask length with the least number of colliding MSs; and a transmitter front end configured to transmit the selected CID mask length in the pointer IE.

29. The base station of claim 28, wherein the colliding MSs are not in either sleep mode or idle mode.

30. The base station of claim 28, wherein the pointer IE is a Hybrid Automatic Repeat-Request (HARQ)-MAP pointer IE for a HARQ MAP message.

31. The base station of claim 28, wherein the pointer IE is a sub-MAP IE for a sub-downlink/uplink map (SUB-DL-UL-MAP) message.

32. The base station of claim 28, further comprising logic for generating a CID mask having the selected CID mask length, wherein the transmitter front end is configured to transmit the CID mask in the pointer IE with the selected CID mask length.

33. The base station of claim 32, wherein the logic for generating the CID mask is configured to set a kth bit of the CID mask to 1 wherever the one or more allocated basic CIDs modulo the selected CID mask length equals k, for each of the one or more allocated basic CIDs.

34. The base station of claim 28, wherein the logic for selecting the CID mask length is configured to determine a set, from among the plurality of possible CID mask lengths, of two or more possible CID mask lengths having the least number of colliding MSs and to select, from among the set of two or more possible CID mask lengths, the CID mask length having the shortest length in bits.

35. The base station of claim 28, wherein the transmitter front end is configured to transmit the CID mask length in the pointer IE in a downlink map (DL-MAP) of an orthogonal frequency-division multiple access (OFDMA) frame.

36. The base station of claim 35, wherein the OFDMA frame is configured in accordance with Institute of Electrical and Electronics Engineers (IEEE) 802.16 technology.

* * * * *